Feb. 29, 1944.   C. A. KRAUSE, JR   2,343,149
PREPARATION OF DEHYDRATED PRECOOKED LEGUMES
Filed Feb. 11, 1943
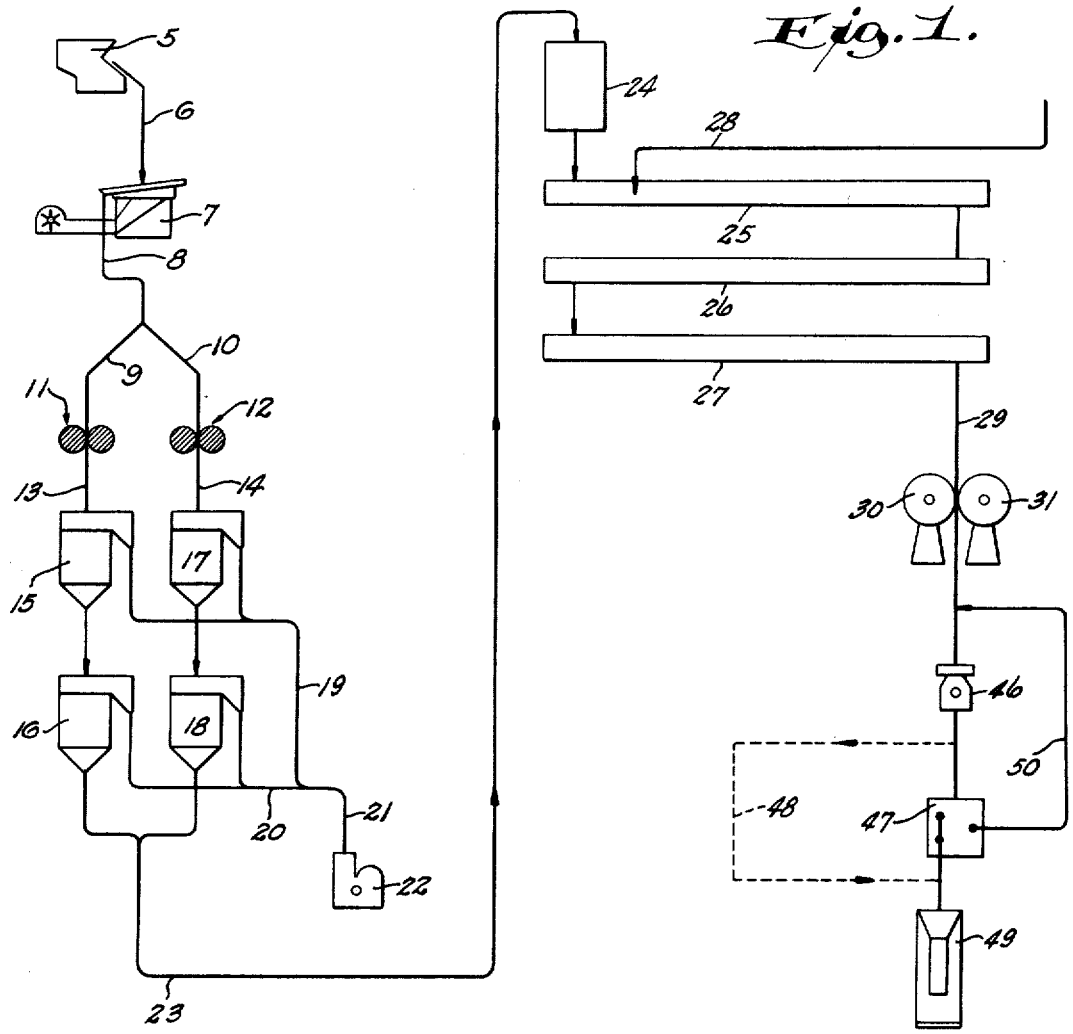
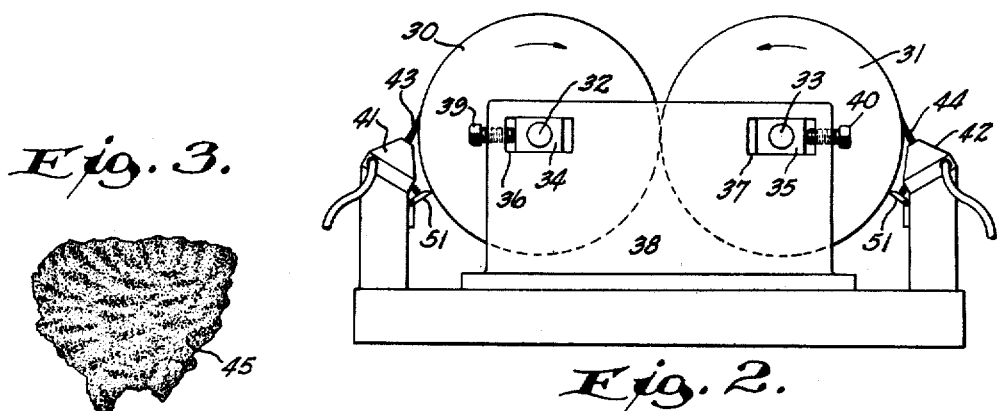
INVENTOR.
Charles C. Krause Jr.
BY Morsell & Morsell
ATTORNEYS.

Patented Feb. 29, 1944

2,343,149

UNITED STATES PATENT OFFICE 2,343,149

PREPARATION OF DEHYDRATED PRE-COOKED LEGUMES

Charles A. Krause, Jr., Milwaukee, Wis.

Application February 11, 1943, Serial No. 475,490

5 Claims. (Cl. 99—204)

This invention relates to improvements in the preparation of dehydrated pre-cooked legumes.

Dried flour has heretofore been produced by first forming a pulpy liquid and boiling the same to completely cook the material and destroy the starch cells, and by then running the previously cooked liquid pulp through ordinary atmospheric drying rolls to remove the moisture. Due to the necessity of first forming a pulpy liquid and completely cooking the same, this type of process is relatively slow and expensive and is not well adapted for high speed production. Furthermore, the amount of moisture which must be evaporated out of the pulpy liquid necessitates relatively slow speed operation of the drying rolls.

The present invention relates particularly to the preparation of legumes such as peas and beans and has for a general object to provide a process which is relatively inexpensive to carry out and which will produce a completely pre-cooked and thoroughly dehydrated legume powder in a relatively short period of time. The powder produced by the present method will dissolve almost instantly in water, and a relatively small amount thereof will form a thick puree. The legume flour may be sold in powder form, mixed with suitable seasoning materials, and used as a concentrate in the making of instantaneous soups, gravies or the like.

A more specific object of the present invention is to provide an improved process of preparing legume flour wherein it is unnecessary to reduce the legumes to a precooked pulpy liquid and wherein the legumes are first hulled and split, then softened by moisture, and pre-heated to a limited extent while in the solid state without breaking down the starch cells, and then while still in a solid moistened state subjected to an extremely high heat and pressure between rollers to instantaneously and completely break down the starch cells, thoroughly cook, and at the same time completely dehydrate.

A further object of the invention is to provide a process as above described wherein the legumes in a solid moistened state are subjected to such a degree of heat and pressure in passing through the pre-cooking rollers that instantaneous cooking and cell rupturing takes place to result in a great increase in production over methods wherein a pulpy pre-cooked liquid is fed between relatively slow speed atmospheric drying rollers.

A further object of the invention is to provide a process as above described which results in a more perfectly cooked and dehydrated soluble food concentrate, which concentrate will produce a relatively thick soup or puree instantaneously by the use of a smaller percentage of the concentrate than has heretofore been thought possible.

With the above and other objects in view, the invention consists of the improvements in the preparation of dehydrated pre-cooked legumes and all its parts and combinations as set forth in the claims, and all equivalents thereof.

In the accompanying drawing illustrating one complete embodiment of the preferred form of apparatus for carrying out the process, Fig. 1 is a diagrammatic flow sheet illustration showing the various steps in the process;

Fig. 2 is an enlarged end view of the pre-cooking rollers; and

Fig. 3 is a top view of a flake of the pre-cooked and dehydrated material as this material leaves the rollers of Fig. 2.

Referring more particularly to the drawing, the legumes in dried form, such as dried peas or beans, are fed into a magnetic separator 5 for the purpose of removing metal particles. Next the legumes travel through a conduit 6 into a gravity stoner 7. From the gravity stoner the legumes pass through a conduit 8 into branch conduits 9 and 10. From the conduits 9 and 10 the material flows through roller mills 11 and 12, or any other suitable apparatus for breaking the legumes into two pieces and for removing the hull. The broken legumes are in the form usually known as splits. Where a roller mill is employed the rolls are usually of corrugated form and are so adjusted as to remove the hulls and split the legumes into two pieces, without crushing the latter. The legumes therefore enter the conduits 13 and 14 in solid split form, together with the loosened hulls.

The hulls are carried away by aspirators 15—16 and 17—18. From the aspirators 15 and 17 the separated hulls are drawn by suction into the conduit 19 and from the aspirators 16 and 18 the hulls are drawn by suction into the conduit 20. The conduits 19 and 20 lead to a common conduit 21 which discharges into a hammer mill 22. The product discharged from the hammer mill 22 is a byproduct of the present process and may be used for feed. The split legumes from the aspirators 16 and 18 are discharged into a conduit 23 leading to a tempering bin 24. In the tempering bin is hot water which serves to soften the split legumes without destroying the solid state. From the tempering bin the legumes may be discharged into a series of steam jacketed conveyors 25, 26, and 27. The legumes travel back and forth through the length of these conveyors while steam is passing through the surrounding jackets. If desired, in the top conveyor 25 steam or hot water may be introduced through the pipe 28 to mingle directly with the legumes passing through the top conveyor 25. The softening or tempering of the legumes may be accomplished both by the use of the tempering bin 24 and by the introduction of steam or hot water through the pipe 28 or by either one of these methods, as long as the function of softening the legumes by the use of hot moisture is carried out.

In passing through the steam-jacketed conveyors 25, 26, and 27, the solid legumes are conveyed by the usual spiral conveyor. No substantial cooking of the product takes place in the steam-jacketed conveyors, but the solid material is pre-heated so that it emerges from the last conveyor into the conduit 29 at a temperature in the neighborhood of 250° F., with the moisture content of the legumes between 18% and 30%. Up to the present point the legumes, therefore, have merely been moistened, softened, and pre-heated.

The rollers 30 and 31 are large size and extremely heavy. These rollers are mounted on shafts 32 and 33 which rotate in bearings 34 and 35. The bearings 35 are adjustable laterally in slots 36 and 37 formed in the end plates 38. The adjustment of the bearings may be accomplished in any desired manner, such as by the use of adjustment bolts 39 and 40. The bolts 39 and 40 are adjusted so that the rollers exert a strong pressure against each other during rotation. In the preferred embodiment of the invention the particular rollers used exert a pressure which is equivalent to forty tons pressing against forty tons.

Extending the length of each roller are gas burners 41 and 42 which direct gas flames 43 and 44 all along the length of the rollers on the periphery thereof. Other forms of heating may be utilized, but it is necessary that the rollers be maintained at a heat of between 400° and 600° F. Any suitable means may be provided for rotating the rollers at a speed of approximately 125 R. P. M.

The rollers must be so heated and exert such a pressure as to cause instantaneous pre-cooking, dehydrating, cell rupturing, and flaking of legumes which are fed thereto in a solid split state with substantial moisture content. The moisture content of the solid legumes together with the heat and pressure between the rollers causes the starch cells to rupture and also causes instantaneous cooking. By having the legumes pre-heated, the capacity of the rollers 30 and 31 is stepped up materially. If the legumes were not pre-heated there would be too great a cooling effect on the rollers and a lighter load would have to be fed. With the present arrangement, however, a relatively heavy load can be fed to the rollers 30 and 31 and the rollers can be rotated at a relatively high speed, such as 125 R. P. M. to greatly increase the capacity and the economy of the operation.

In passing through the rollers 30 and 31 the split legumes are pressed into contact with one another forming flakes, such as the flake 45 of Fig. 3, of varying size. These flakes are of wafer thinness and have small surface ripples thereon. By pressing the legumes to the flake form under the type of heat and pressure utilized, the heat will instantaneously affect all portions of the legumes and cause complete cell rupturing and complete pre-cooking as well as instantaneous dehydration. During normal operation the legumes emerge from the rollers 30—31 in the form of continuous strips of varying width which later break up into shorter lengths due to the thinness of the material. During normal operation the legumes are in contact with the rollers only at the bite of the rollers, and except for an occasional particle, which may be removed by scraper blades 51, do not remain on the periphery of the rollers. The flakes are immediately withdrawn from the bite of the rollers by suction, or may be permitted to fall by gravity.

These rollers are to be distinguished from the rollers used as ordinary atmospheric drum dryers. The ordinary atmospheric drum dryers can only operate effectively on a pulpy liquid and are for the purpose of dehydrating only, because the pulpy liquids in other processes are already pre-cooked. Where pulpy liquids are fed to drying rollers the rollers are heated, usually by steam therewithin, to a lower temperature and do not exert as great a pressure. Furthermore, the ordinary atmospheric drum drying rollers usually rotate at a speed of about 12 R. P. M. and the pulpy liquid remains on the rollers for about a half a revolution, to effect complete drying, and is then removed by scraper blades.

From the rollers 30—31 the flakes may be conveyed to a hammer mill or cutter 46 and then either to a sifter 47, if sifting is necessary, or through a by-pass 48 directly into a packer 49. If the legumes are fed into a sifter some of the separated material may be sent back through the hammer mill through a conduit 50 for further powdering.

While the powder form of the final product is the most desirable, powdering is unnecessary and the legumes may be used in the flake form of Fig. 3. These flakes, or the powder made therefrom, are highly soluble even in cold water. By mixing the flakes or powder with suitable seasoning materials such as onion powder, spiced salt, yeast, and powdered milk, a very excellent soup concentrate may be formed. This concentrate will dissolved instantly in water to form a thick soup, puree, or gravy. Due to the complete pre-cooking which took place in the rollers 30—31, no cooking of the soup or gravy is necessary at the time of use. However, hot water is usually added instead of cold merely to improve the palatability and because soups are usually served in hot condition. Due to the use of the improved process, and the high degree of solubility of the perfectly pre-cooked material, a greater economy in use is effected than with other known soup concentrates. For example, three ounces of the powder will make one and one-half quarts of soup.

All of the apparatus described and shown in Fig. 1 is not necessary to carry out the process as long as suitable instrumentalities are employed for hulling, moisture softening, and pre-heating before the legumes are fed between the rollers 30—31.

Various changes and modifications may be made in the exact method of procedure, and all of such changes are contemplated as may come within the scope of the claims.

What I claim is:

1. In a method of preparing dehydrated pre-cooked legumes the steps of hulling the legumes, subjecting the legumes to the action of heat and moisture to soften and pre-heat the same without affecting their solid state or rupturing their cells while leaving the legumes with substantial moisture content, and then by means of rollers heated to a temperature of between 400° F. and 600° F. subjecting the moistened legumes in the solid state to said heat and to mechanical pressure sufficient at the particular heat to cause instantaneous rupturing of the cells, pre-cooking, and dehydrating.

2. In a method of preparing dehydrated pre-cooked legumes the steps of hulling the legumes, subjecting the legumes to the action of heat and moisture to soften and pre-heat the same without affecting their solid state or rupturing their cells while leaving the legumes with substantial moisture content, and then subjecting the moistened legumes in the solid state to heat and high mechanical pressure by means of heated rollers at a temperature of between 400° and 600° F. the pressure being sufficient at the particular heat to cause instantaneous rupturing of the cells, pre-cooking, and dehydrating.

3. In a method of preparing dehydrated pre-cooked legumes, the steps of hulling the legumes, subjecting the legumes to the action of heat and moisture to soften and pre-heat the same without affecting their solid state or rupturing their cells while leaving the legumes with substantial moisture content, and then heat pressing the tempered legumes from said solid moistened state into wafer thin soluble flakes while utilizing heat of between 400° F. and 600° F. and mechanical pressure sufficient at the particular heat to cause instantaneous rupturing of the cells, pre-cooking and dehydrating.

4. In a method of preparing dehydrated pre-cooked legumes the steps of hulling the legumes, subjecting the legumes to the action of heat and moisture to soften and pre-heat the same without affecting their solid state or rupturing their cells while leaving the legumes with substantial moisture content, and then passing the legumes in said pre-heated moistened solid state between hot pressure rollers which are heated to between 400° F. and 600° F. and exert such high pressure as to simultaneously cause instantaneous pre-cooking, dehydrating, cell rupturing and flaking.

5. In a method of preparing dehydrated pre-cooked legumes the steps of hulling and splitting the legumes, subjecting the split legumes to the action of heat and moisture to soften and pre-heat the same without affecting their solid split state or rupturing the starch cells while leaving them with substantial moisture content, and then passing the split legumes in said pre-heated moistened state between hot pressure rollers which are heated to between 400° F. and 600° F. and exert such high pressure as to simultaneously cause instantaneous pre-cooking, dehydrating, cell rupturing and flaking.

CHARLES A. KRAUSE, Jr.